US012400781B2

(12) United States Patent
Hombsch et al.

(10) Patent No.: US 12,400,781 B2
(45) Date of Patent: Aug. 26, 2025

(54) ADJUSTABLE MULTI-GAPPED COMBINED COMMON MODE AND DIFFERENTIAL MODE THREE PHASE INDUCTORS AND METHODS OF MANUFACTURE AND USE THEREOF

(71) Applicant: MTE, LLC, New York, NY (US)

(72) Inventors: Richard C. Hombsch, Milwaukee, WI (US); Ashwin Kudmulwar, Milwaukee, WI (US); Todd Shudarek, West Bend, WI (US)

(73) Assignee: MTE, LLC, New York, NY (US)

(*) Notice: Subject to any disclaimer, the term of this patent is extended or adjusted under 35 U.S.C. 154(b) by 443 days.

(21) Appl. No.: 17/476,268

(22) Filed: Sep. 15, 2021

(65) Prior Publication Data

US 2022/0084735 A1 Mar. 17, 2022

Related U.S. Application Data

(60) Provisional application No. 63/079,871, filed on Sep. 17, 2020.

(51) Int. Cl.
*H01F 27/26* (2006.01)
*H01F 41/02* (2006.01)

(52) U.S. Cl.
CPC ......... *H01F 27/26* (2013.01); *H01F 41/0206* (2013.01)

(58) Field of Classification Search
CPC ........ H01F 27/26; H01F 41/0206; H01F 3/14; H01F 27/245; H01F 37/00
See application file for complete search history.

(56) References Cited

U.S. PATENT DOCUMENTS

| | | | | |
|---|---|---|---|---|
| 564,944 A * | 7/1896 | Sessons | H01F 27/245 336/215 |
| 10,748,703 B2 * | 8/2020 | Shirouzu | H01F 27/324 |
| 2009/0140829 A1 | 6/2009 | Sodo | |
| 2009/0261939 A1 * | 10/2009 | Shudarek | H01F 27/263 336/212 |

(Continued)

OTHER PUBLICATIONS

International Search Report and Written Opinion from International Application No. PCT/US2021/050517 dated Dec. 6, 2021.

*Primary Examiner* — Tuyen T Nguyen
(74) *Attorney, Agent, or Firm* — GREENBERG TRAURIG, LLP

(57) ABSTRACT

Systems and methods of the present disclosure enable adjustable multi-gapped combined common mode and differential mode three phase inductors using at least one core. The at least one core may include: a first core segments and at least one second core segment, where each first core segment has at least one first shape and where the first core segments are arranged in a first pattern so as to form differential mode gaps between each first core segment and the at least one second core segment. The first shape is such that the first pattern permits to independently adjust a thickness of each differential mode gap. The at least one second core segment has a second shape and the first core segments are in an interior of the core and the at least one second core segment at least partially encompasses the first core segments.

17 Claims, 16 Drawing Sheets

(56) References Cited

U.S. PATENT DOCUMENTS

| | | | | |
|---|---|---|---|---|
| 2010/0194512 | A1* | 8/2010 | Pieteris | H01F 37/00 336/110 |
| 2015/0102882 | A1 | 4/2015 | Shudarek | |
| 2017/0040099 | A1 | 2/2017 | Bhide et al. | |
| 2017/0301452 | A1 | 10/2017 | Shudarek | |
| 2019/0006080 | A1* | 1/2019 | Iizuka | H03H 7/427 |

* cited by examiner

ADJUSTABLE MULTI-GAPPED COMBINED COMMON MODE AND DIFFERENTIAL MODE THREE PHASE INDUCTORS AND METHODS OF MANUFACTURE AND USE THEREOF

TECHNICAL FIELD

In some embodiments, the instant invention relates to three phase inductors and methods of manufacture and use thereof.

BACKGROUND

Typically, a three-phase inductor has either common mode or differential mode magnetic paths. New three-phase reactor geometries developed over the past few years are able to incorporate both differential and common mode flux paths into a single inductor.

SUMMARY OF INVENTION

In some embodiments, the instant invention can provide an electrical system that at least includes the following: a three-phase inductor with both common mode and differential mode magnetic flux paths. In some embodiments, the three-phase inductor is constructed from at least one common mode core segments and at least three differential mode core segments to create a three-phase core with multiple adjustable differential mode gaps and multiple common mode gaps. The multiple gaps may provide benefits, including: reduction of external magnetic flux fields, reduction of heating, and reduction of audible noise. Once the core pieces and coils are manufactured, the common mode and differential mode inductances can be independently tuned by adjusting the gaps.

In some embodiments, the electrical system is a Sinewave filter.

In some embodiments, the electrical system is a harmonic mitigating filter.

In some embodiments, the present disclosure provides an exemplary technically improved apparatus that includes at least the following components of at least one three-phase inductor. The at least one three-phase inductor may include: at least one core. The at least one core may include: a plurality of first core segments and at least one second core segment; where each first core segment of the plurality of first core segments has at least one first shape; where the plurality of first core segments is arranged in at least one first pattern so as to form a plurality of differential mode gaps between the plurality of first core segments and the at least one second core segment; where the at least one first shape is such that the at least one first pattern permits to independently adjust a thickness of each differential mode gap of the plurality of differential mode gaps; where the at least one second core segment has at least one second shape; and where the plurality of first core segments are in an interior of the core and the at least one second core segment at least partially encompasses the plurality of first core segments.

In some embodiments, the present disclosure provides an exemplary technically improved apparatus that includes at least the following components of at least one three-phase inductor. The at least one three-phase inductor may include a plurality of stacked core laminations. The plurality of stacked core laminations may include a plurality of first core segments and at least one second core segment; where each first core segment of the plurality of first core segments has at least one first shape; where the plurality of first core segments is arranged in at least one first pattern so as to form a plurality of differential mode gaps between the plurality of first core segments and the at least one second core segment; where the at least one first shape is such that the at least one first pattern permits to independently adjust a thickness of each differential mode gap of the plurality of differential mode gaps; where the at least one second core segment has at least one second shape; and where the plurality of first core segments are in an interior of the core and the at least one second core segment at least partially encompasses the plurality of first core segments.

In some embodiments, the present disclosure provides an exemplary technically improved method that includes at least the following steps of providing at least one three-phase inductor. The at least one three-phase inductor may include at least one core. The at least one core may include a plurality of first core segments and at least one second core segment; where each first core segment of the plurality of first core segments has at least one first shape; where the plurality of first core segments is arranged in at least one first pattern so as to form a plurality of differential mode gaps between the plurality of first core segments and the at least one second core segment; where the at least one first shape is such that the at least one first pattern permits to independently adjust a thickness of each differential mode gap of the plurality of differential mode gaps; where the at least one second core segment has at least one second shape; and where the plurality of first core segments are in an interior of the core and the at least one second core segment at least partially encompasses the plurality of first core segments.

In some embodiments, systems, methods and/or apparatuses of the present disclosure may further include where the at least one first core segment comprises a polygonal shape.

In some embodiments, systems, methods and/or apparatuses of the present disclosure may further include where the at least one second core segment comprises a toroidal shape.

In some embodiments, systems, methods and/or apparatuses of the present disclosure may further include at least one inductor coil positioned on the at least one second core segment.

In some embodiments, systems, methods and/or apparatuses of the present disclosure may further include where an electrical current in the at least one inductor coil causes at least one common mode flux path associated with a common mode inductance around the at least on second shape via the at least one second core segment.

In some embodiments, systems, methods and/or apparatuses of the present disclosure may further include where an electrical current in the at least one inductor coil causes a plurality of differential mode flux paths associated with a differential mode inductance through the at least on first shape via the plurality of first core segments, and where the differential mode inductance is adjusted by the thickness of each differential mode gap.

In some embodiments, systems, methods and/or apparatuses of the present disclosure may further include where the at least one second core segment is a plurality of second core segments, where the plurality second core segments are arranged in at least one second pattern to form a plurality of common mode gaps between the plurality of second core segments, where the at least one second shape is such the at least one second pattern permits to independently adjust a thickness of each common mode of the plurality of common mode gaps, and where the at least one first pattern is different from the at least one second pattern.

In some embodiments, systems, methods and/or apparatuses of the present disclosure may further include where each stacked core lamination of the plurality of stacked core laminations is interleaved with at least one adjacent stacked core lamination of the plurality of stacked core laminations.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION OF SOME EMBODIMENTS

Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive. Any alterations and further modifications of the inventive feature illustrated herein, and any additional applications of the principles of the invention as illustrated herein, which would normally occur to one skilled in the relevant art and having possession of this disclosure, are to be considered within the scope of the invention.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, "high permeability" means a magnetic permeability that is at least 1000 times greater than the permeability of air, and "low permeability" means a magnetic permeability that is less than 100 times the permeability of air.

In some embodiments, the present invention is directed to devices having at least one inductor core, being constructed as an integrated common mode/differential mode three phase inductor core with adjustable differential mode inductance and increased common mode inductance.

Figure 1:
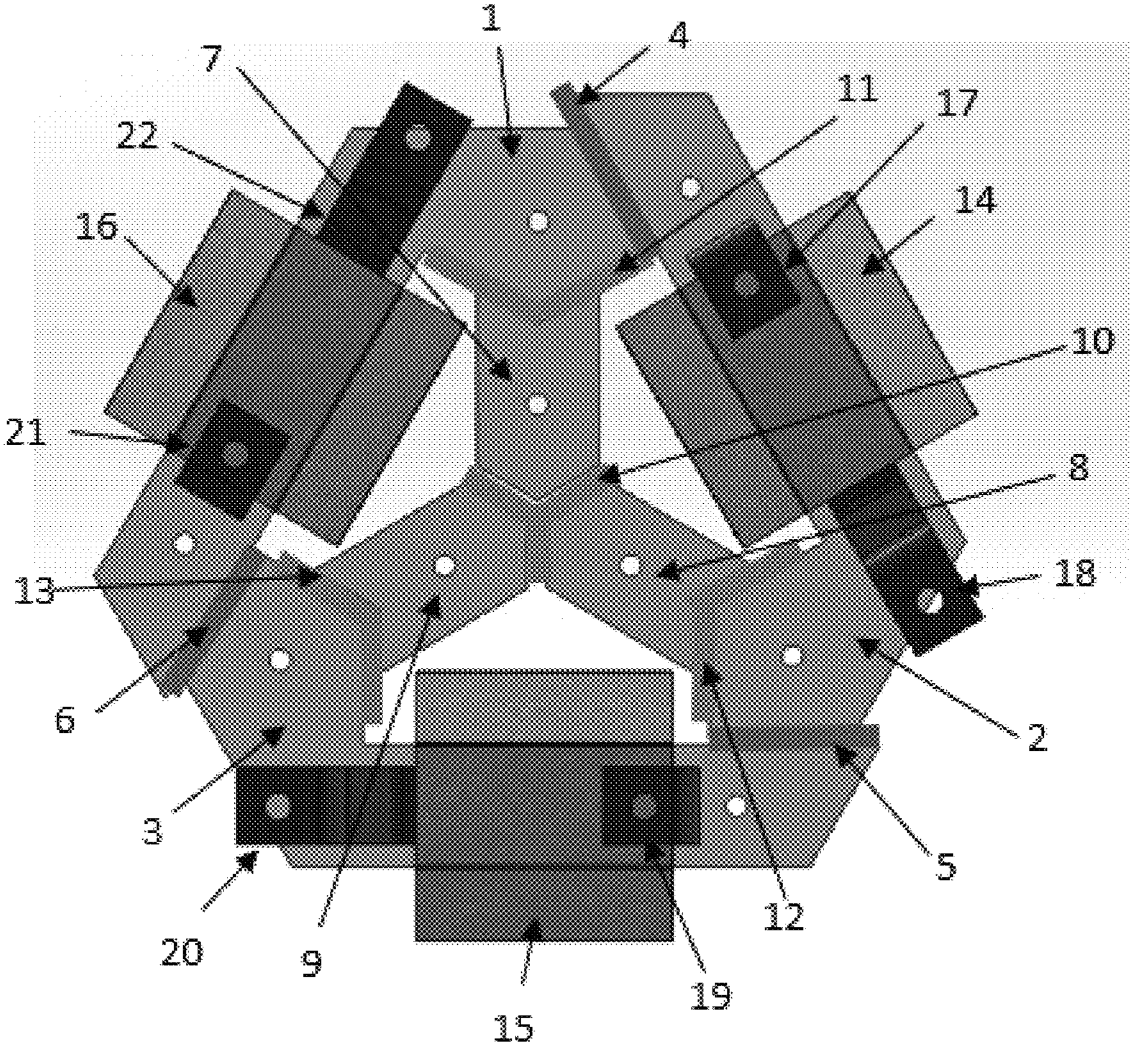
FIGS. 1-16 are snapshots that illustrate certain aspects of the instant invention in accordance with some embodiments of the instant invention.

FIG. 1 shows an exemplary construction of the exemplary inventive induction core in accordance with some embodiments of the present invention. In some embodiments, the exemplary inventive induction core can include common mode core segments (1, 2, 3) forming a periphery of the induction core shape. Each common mode core segment (1, 2, 3) may be separated from each adjacent common mode core segment (1, 2, 3) by common mode gaps (e.g., 4, 5 and 6 of FIG. 1). In some embodiments, an interior of the shape of the inductor core may include differential mode core segments (e.g., 7, 8 and 9 of FIG. 1), for example having a spoke arrangement. Each differential mode core segment (e.g., 7, 8 and 9 of FIG. 1) may be separated from each adjacent differential mode core segment and each adjacent common mode core segment (1, 2, 3) by differential mode gaps (e.g., 10, 11, 12 and 13 of FIG. 1).

In some embodiments, the exemplary inventive induction core may include three coils (e.g., 14, 15 and 16 of FIG. 1) that are wound with suitable winding materials such as, but not limited to, a copper or aluminum magnet wire, Litz wire, insulated copper foil, one other similarly suitable material, and any combination thereof. For example, the inventive construction can have at least one insulation material such as, but not limited to, Rynite, glass-filled nylon, Dupont Nomex material, or any combination thereof. In some embodiments, the insulation material may be provided between each of the coils (e.g., 14, 15 and 16 of FIG. 1) and the common mode core segment (e.g., 1, 2 and 3 of FIG. 1) on which the coils (e.g., 14, 15 and 16 of FIG. 1) are positioned.

In some embodiments, each coil (e.g., 14, 15 and 16 of FIG. 1) may include terminals for providing an electrical current. In some embodiments, each coil (e.g., 14, 15 and 16 of FIG. 1) may include, e.g., one, two, three, four or more terminals or any other suitable number of terminals for providing an electrical current to each coil (e.g., 14, 15 and 16 of FIG. 1). For example, as shown in FIG. 1, there may be two terminals per coil, such as terminals 17 and 18 of coil 14, terminals 19 and 20 of coil 15, and terminals 21 and 22 of coil 16.

In some embodiments, fasteners may be provided to connect the coils (e.g., 14, 15 and 16 of FIG. 1), common mode core segment (1, 2, 3) and differential mode core segments (e.g., 7, 8 and 9 of FIG. 1). For example, as shown in FIG. 1, the inventive induction core can be held together by numerous nuts, bolts, and/or washer. In some embodiments, the common mode core segment (1, 2, 3 of FIG. 1) and differential mode core segments (e.g., 7, 8 and 9 of FIG. 1) can be fastened together in one or more layers of the arrangement as shown in FIG. 1 using bolts, such as steel bolts, with shoulder washers. In some embodiments, the shoulder washers may be formed from a suitable insulating material, such as, e.g., plastic or other suitable insulator. In some embodiments, an insulating shoulder washer may prevent shorting of a layer of the common mode core segment (1, 2, 3 of FIG. 1) and differential mode core segments (e.g., 7, 8 and 9 of FIG. 1) through the bolt.

All gaps (e.g., 4, 5 and 6 of FIG. 1, e.g., 10, 11, 12 and 13 of FIG. 1) can be filled with air and/or standard insulation material(s) such as Glastic, GLASROD, Thermavolt paper, Nomex, a fiberglass-reinforced thermoset polyester or any combination thereof. Some constructions may also use standard core materials for gaps such as powered iron, Molypermalloy, ferrite, steel, Sendust or other core materials or any combination thereof. Thickness of each differential mode gap may vary from 0.05 to 1 inch. As mentioned previously multiple gaps can reduce the external magnetic flux fields, reduce heating and reduce audible noise.

Figure 2:
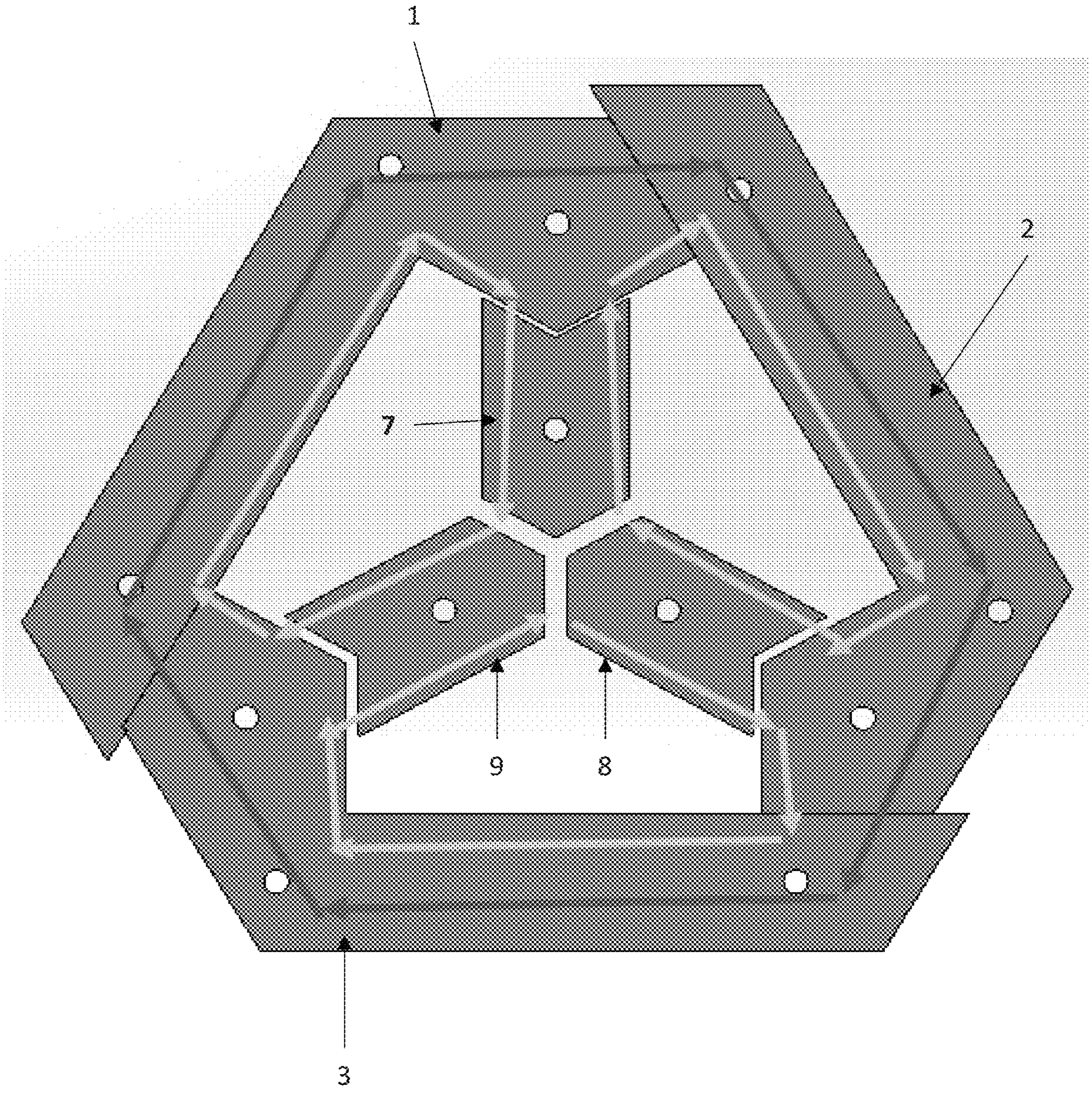

FIG. 2 shows a more detailed view of the exemplary core structure of the exemplary construction of adjustable gaps with the three common mode core segments and three differential mode core segments in accordance with some embodiments of the instant invention. In some embodiments of the instant invention, one of three differential mode inductance flux paths (pass through differential mode core segments (e.g., 7, 8 and 9 of FIG. 1) are shown in FIG. 2. In some embodiments of the instant invention, the flux paths go through a coil and the center of the core structure. In some embodiments of the instant invention, the common mode flux paths (around the periphery of the core structure via the common mode core segments (1, 2, 3)) are shown in FIG. 2.

In accordance with some embodiments of the instant invention, the common mode inductance is determined by selecting the combination of the following variables: the core material and size, number of coil turns, and the thickness of the common mode gaps (e.g., 4, 5 and 6 of FIG. 1.). In some embodiments, the differential mode inductance is determined by selecting the combination of the following variables: the core material and size, number of coil turns, the thickness of the common mode gaps (e.g., 4, 5 and 6 of FIG. 1), and the thickness of the differential mode gaps (e.g., 10, 11, 12 and 13 of FIG. 1). Since, in accordance with some embodiments of the instant invention, the differential mode flux path has both the common mode gap(s) (e.g., 4, 5 and 6 of FIG. 1.) and the differential mode gap(s) (e.g., 10, 11, 12 and 13 of FIG. 1) along the path, both types of gaps can be independently changed to adjust the differential mode inductance.

Figure 3:
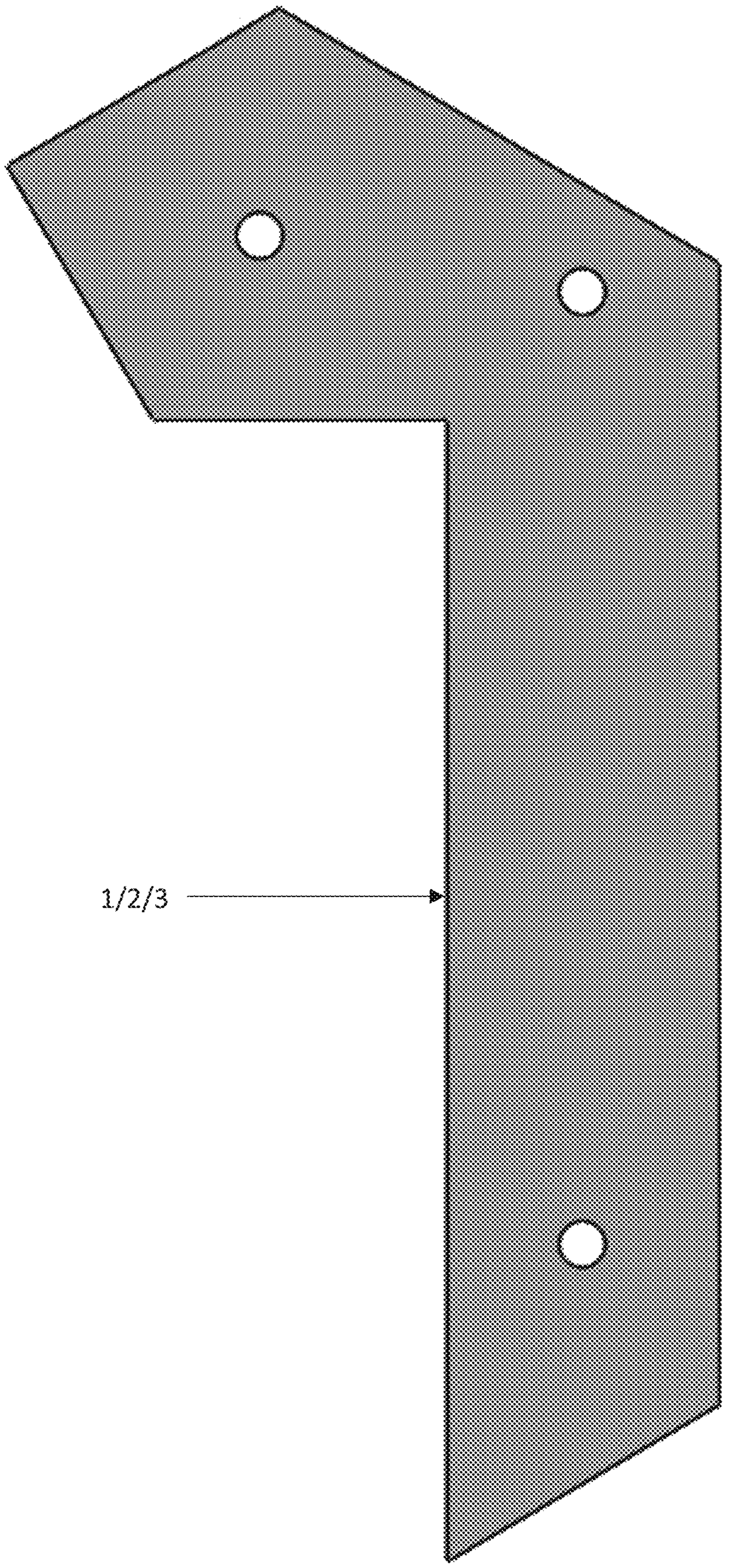

In accordance with some embodiments of the instant invention, the differential mode gaps are placed at a 90-degree angle to the common mode gaps as shown in FIG. 3. In accordance with some embodiments of the instant invention, the 90 degree angle allows the differential mode gaps and the common mode gaps to be adjusted independently during the design and/or manufacturing without modifying shape and/or size of the individual core piece/segment (1, 2, 3, 7, 8 and 9 of FIGS. 1 and 2) (i.e., the positioning of the individual core pieces/segments relative to each other within the exemplary core can be adjusted during the design and/or manufacturing without modifying shape and/or size of each individual core piece/segment (1, 2, 3, 7, 8 and 9 of FIGS. 1 and 2)—the exemplary inductor during the operation has core pieces/segments in a fixed position relative to each other).

In some embodiments, the common mode inductance is determined by selecting the combination of the following variables: the core material and size, number of coil turns, and the thickness of the common mode gaps (e.g., 4, 5 and 6 of FIG. 1). The differential mode inductance is determined by selecting the combination of the following variables: the core material and size, number of coil turns, the thickness of the common mode gaps (e.g., 4, 5 and 6 of FIG. 1), and the thickness of the differential mode gaps (e.g., 10, 11, 12 and 13 of FIG. 1). Since, in accordance with some embodiments of the instant invention, the differential mode flux path has both the common mode gap(s) (e.g., 4, 5 and 6 of FIG. 1) and the differential mode gap(s) (e.g., 10, 11, 12 and 13 of FIG. 1) along the path, both types of gaps can be independently changed to adjust the differential mode inductance.

In some embodiments, the inductor core construction includes three common mode core segments (e.g., 1, 2 and 3 of FIG. 1). The common mode core segments (e.g., 1, 2 and 3 of FIG. 1) are arranged to provide gaps between each segment forming three common mode gaps (e.g., 4, 5 and 6 of FIG. 1). Common mode inductances may be adjusted by expanding or narrowing the common mode gaps (e.g., 4, 5 and 6 of FIG. 1) to tune common mode inductance to a desired value. Common mode gaps can range from 0 to 0.5 inches with the maximum common mode inductance occurring when the gap is set to 0 inches. Other possible ranges are contemplated, such as, e.g., between 0 and 0.4 inches, between 0 and 0.3 inches, between 0 and 0.2 inches, between 0 and 0.25 inches, between 0.1 and 0.4 inches, between, 0.2 and 0.3 inches, between 0.25 and 0.5 inches, or other suitable range. For example, FIG. 2 shows common mode and differential mode flux paths using a geometry according aspects of embodiments of the present invention. These common mode core segments carry both common mode and differential mode flux. The gaps are adjustable to tune the common mode inductance to the required value.

Similarly, in some embodiments, the differential mode gaps (e.g., 10, 11, 12 and 13 of FIG. 1) may have thicknesses that are independently adjustable to tune differential mode inductances by expanding or narrowing each of the differential mode gaps (e.g., 10, 11, 12 and 13 of FIG. 1). In some embodiments, the thickness of each of differential mode gaps (e.g., 10, 11, 12 and 13 of FIG. 1) can independently vary from 0.05 to 0.25 inches. In some embodiments, the thickness of each of the differential mode gaps (e.g., 10, 11, 12 and 13 of FIG. 1) can independently vary from 0.1 to 0.25 inches. In some embodiments, the thickness of each of the differential mode gaps (e.g., 10, 11, 12 and 13 of FIG. 1) can independently vary from 0.15 to 0.25 inches. In some embodiments, the thickness of each of the differential mode gaps (e.g., 10, 11, 12 and 13 of FIG. 1) can independently vary from 0.1 to 0.2 inches.

FIG. 3 depicts an example shape for a common mode core segment. In some embodiments, the common mode core segment (e.g., 1, 2 and/or 3 of FIG. 1 or 2) may have a shape with a plurality of sides such that when fitting multiple common mode core segments (e.g., 1, 2 and/or 3 of FIG. 1 or 2) together in a radial pattern (see, e.g., FIG. 2 and FIG. 4), an outer edge of a first common mode core segment aligns with an inner edge of a second common mode core segment in a parallel relationship. Thus, during construction, the outer edge of the first common mode core segment may be positioned along the inner edge of the second common mode core segment to adjust the differential mode gaps (e.g., 10, 11, 12 and 13 of FIG. 1) by reducing the diameter of the radial pattern of common mode core segments.

Figure 4:
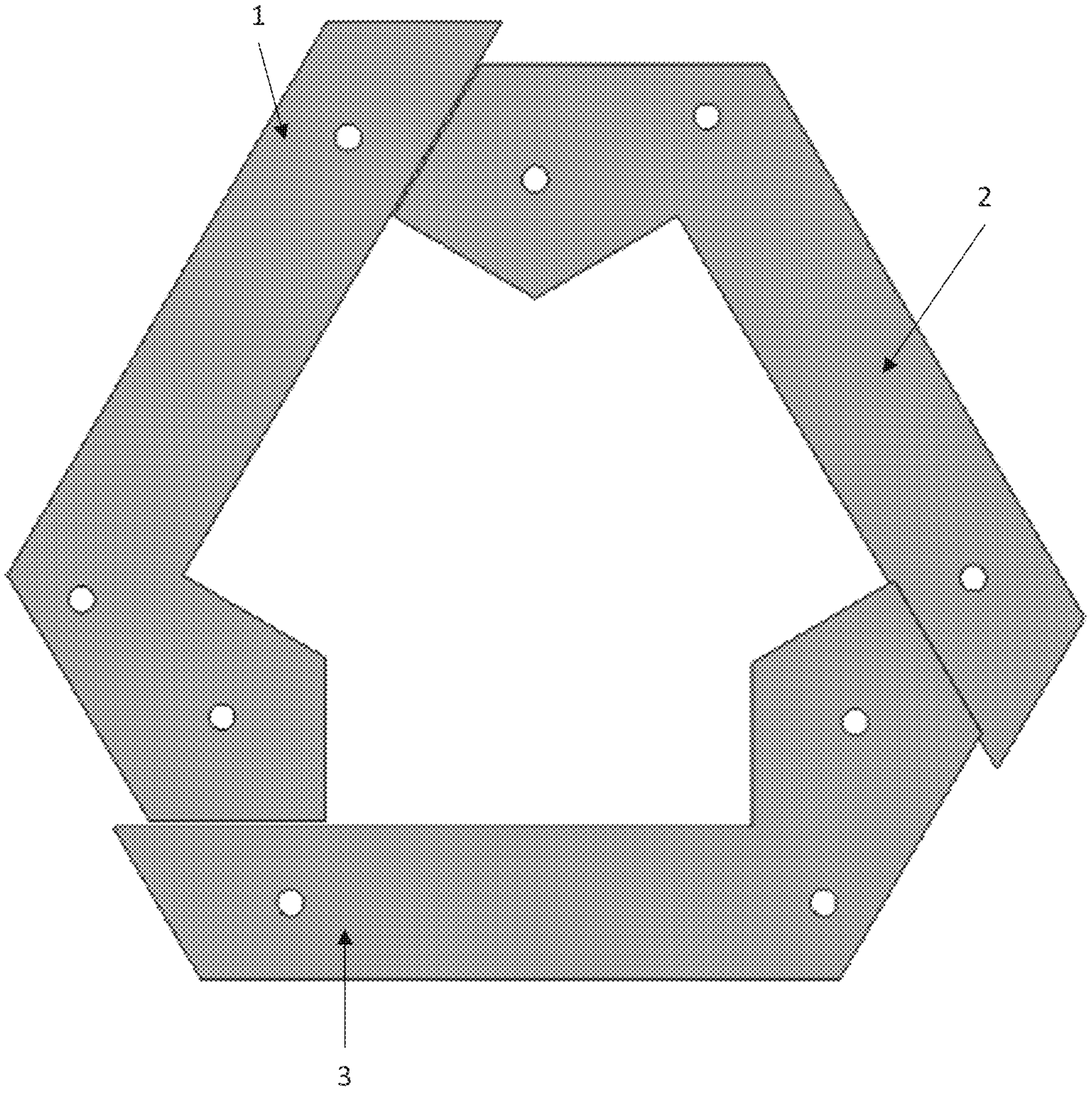

For example, FIG. 4 shows an exemplary single lamination which is representative of a plurality of laminations which can be utilized to construct the illustrative core piece of FIG. 1. In some embodiments, the exemplary inventive core may include a stack of laminations, which may be interleaved in groups of one or more laminations to change the common mode inductance.

Figure 6:
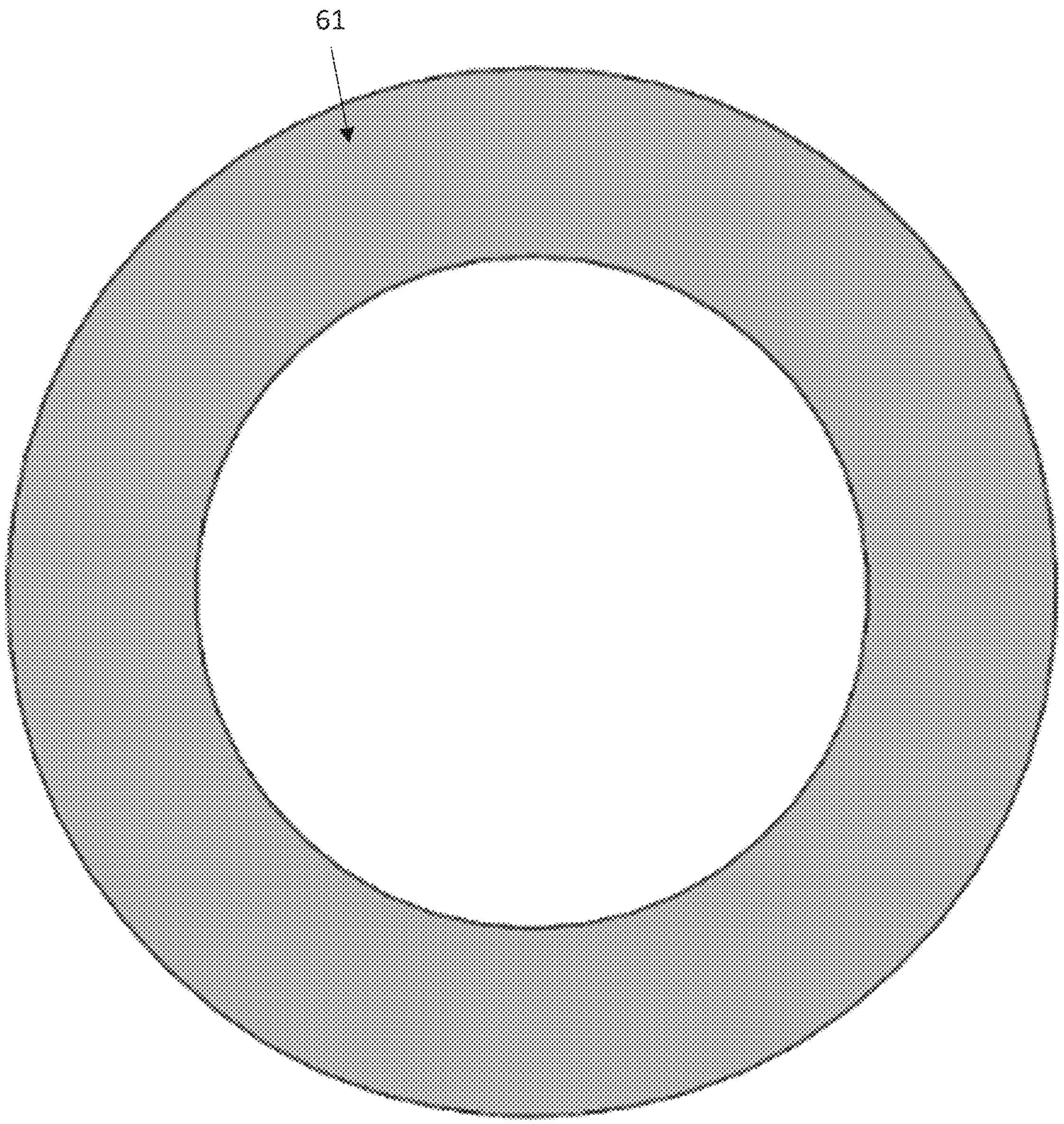
Figure 7:
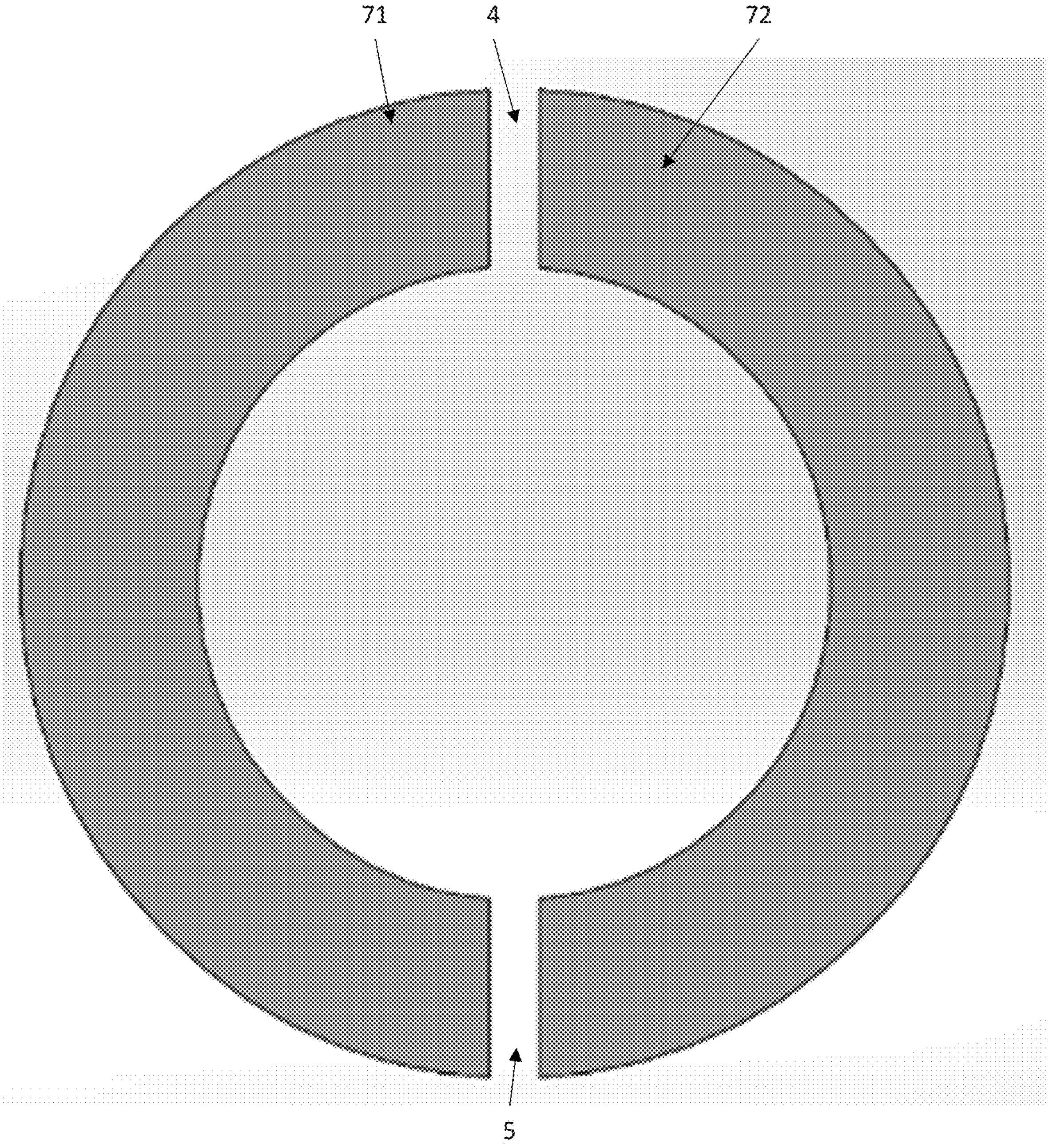
Figure 8:
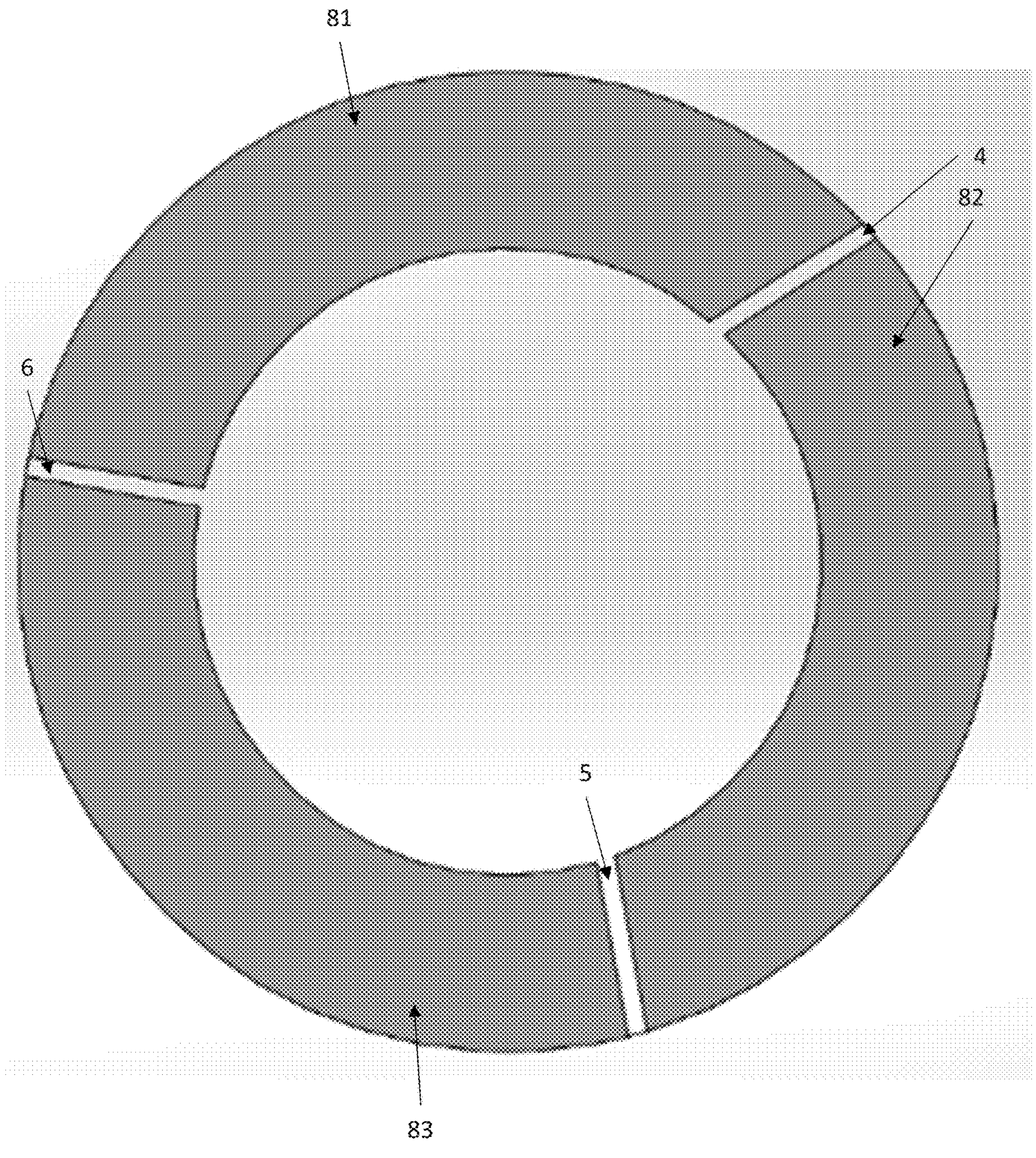

However, other common mode core geometries may be employed that allow for the common mode flux paths depicted in FIG. 2 above. For example, the common mode core of FIG. 4 can be constructed from a single piece, though doing so may reduce the ability to adjust common mode inductances. Other examples can include toroidal arrangements, such as common mode core toroid 61 geometry with no gaps (see, FIG. 6). A similar common mode toroid geometry may be employed where the toroid is formed from two semi-circular common mode core segments (e.g., 71 and 72 of FIG. 7) to produce a toroid with two gaps (e.g., 4, 5 of FIG. 7), or from three common mode core segments (e.g., 81, 82, 83 of FIG. 8) to produce a toroid with three gaps (e.g., 4, 5 and 6 of FIG. 1) (see, FIG. 8) or as many segments as desired. Other geometries may be employed that form an inductor with common mode flux paths around a periphery of the inductor while enabling differential mode flux paths into the interior of the inductor such that gaps between segments may be adjusted to tune inductances.

In some embodiments, the common mode core segments (e.g., 1, 2 and 3 of FIG. 1) are made from standard core materials such as steel laminations, powdered iron, ferrite, molypermalloy, sendust or any combination thereof.

FIG. 4 depicts an example positioning of common mode core segments having a shape as depicted for the common mode core segment (e.g., 1, 2 and/or 3 of FIG. 1 or 2 or 3) in accordance with embodiments of the present disclosure. In some embodiments, the shape depicted in FIG. 3 facilitates creating a common mode core by fitting each common mode core segment (e.g., 1, 2 and/or 3 of FIG. 1 or 2) according to the example positioning of common mode core segments as shown in FIG. 4.

In some embodiments, this geometry offers simple adjustment of the common mode gaps by increasing or decreasing the distance between the outer edge of the first common mode core segment may be positioned along the inner edge of the second common mode core segment associated with each common mode gap (e.g., 4, 5 and 6 of FIG. 1).

Figure 5:
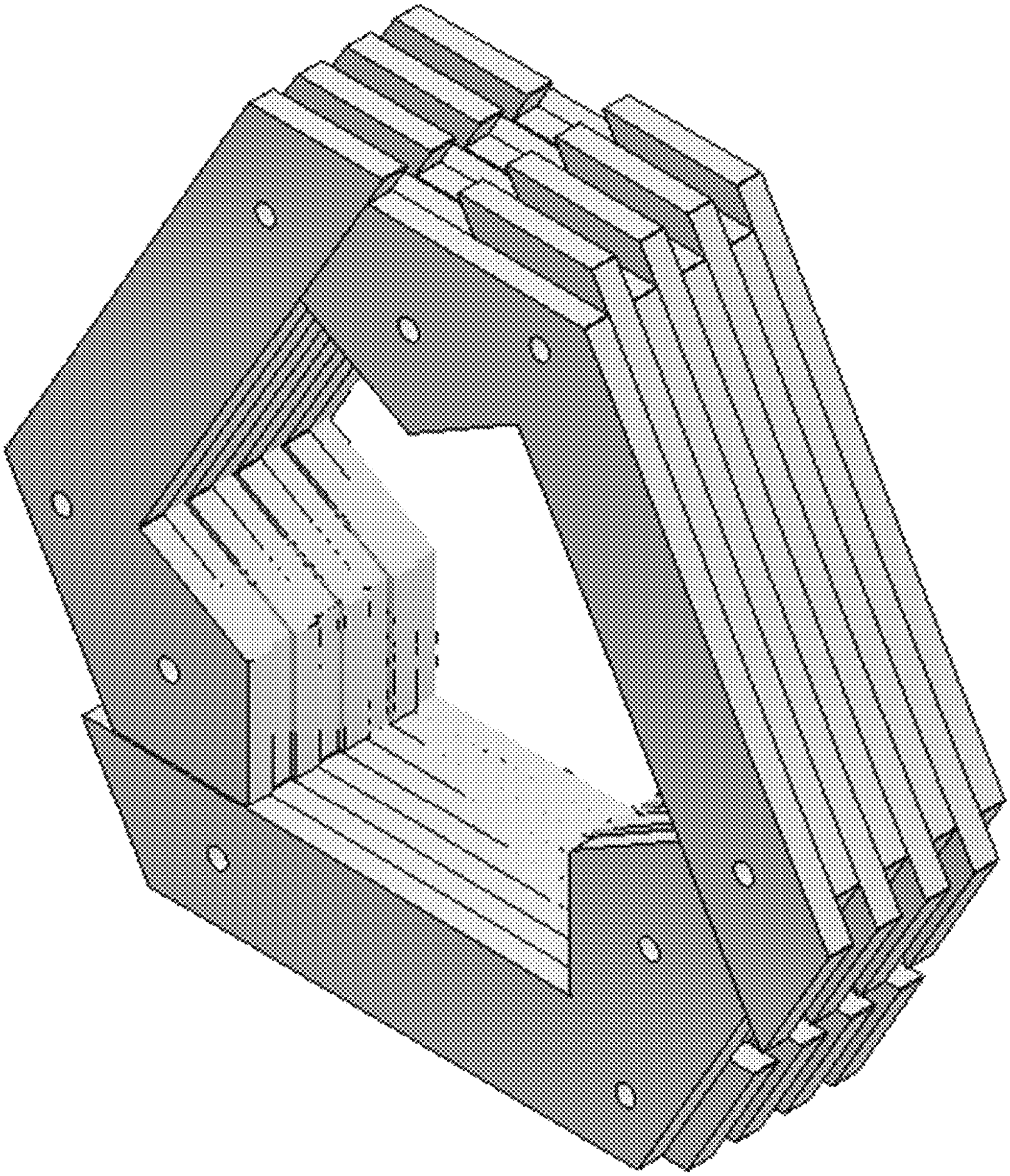

FIG. 5 depicts laminations of common mode cores to form the common mode flux path for the inductor shown in FIG. 1 in accordance with aspects of embodiments of the present disclosure. In some embodiments, in accordance with the present invention each core shape, as for example, but not limited to, shown in FIG. 3-8, can be constructed from a plurality of laminations of common mode cores. In some embodiments, the laminations may include interleaved common mode cores to increase the common mode inductance. In some embodiments, the laminations may be non-interleaved common mode cores with common mode core segments being aligned with common mode core segments from other lamination layers to form layered common mode core segments for a layered common mode core. The specific disclosures of the induction core design and construction described in U.S. Pat. No. 9,613,745, to Shudarek ("Shudarek U.S. Pat. No. 9,613,745") are hereby incorporated herein for all purposes.

Figure 13:
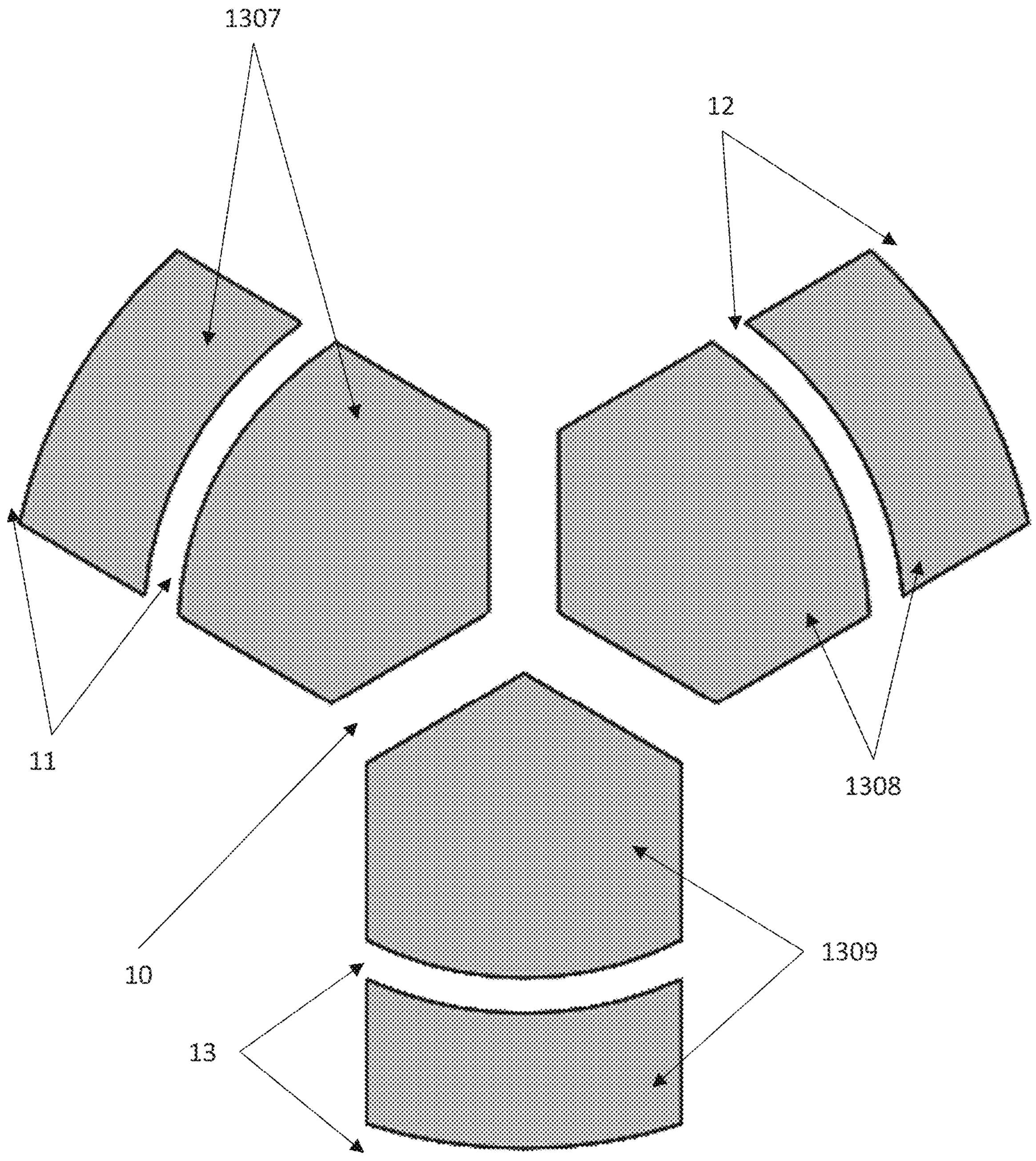
Figure 14:
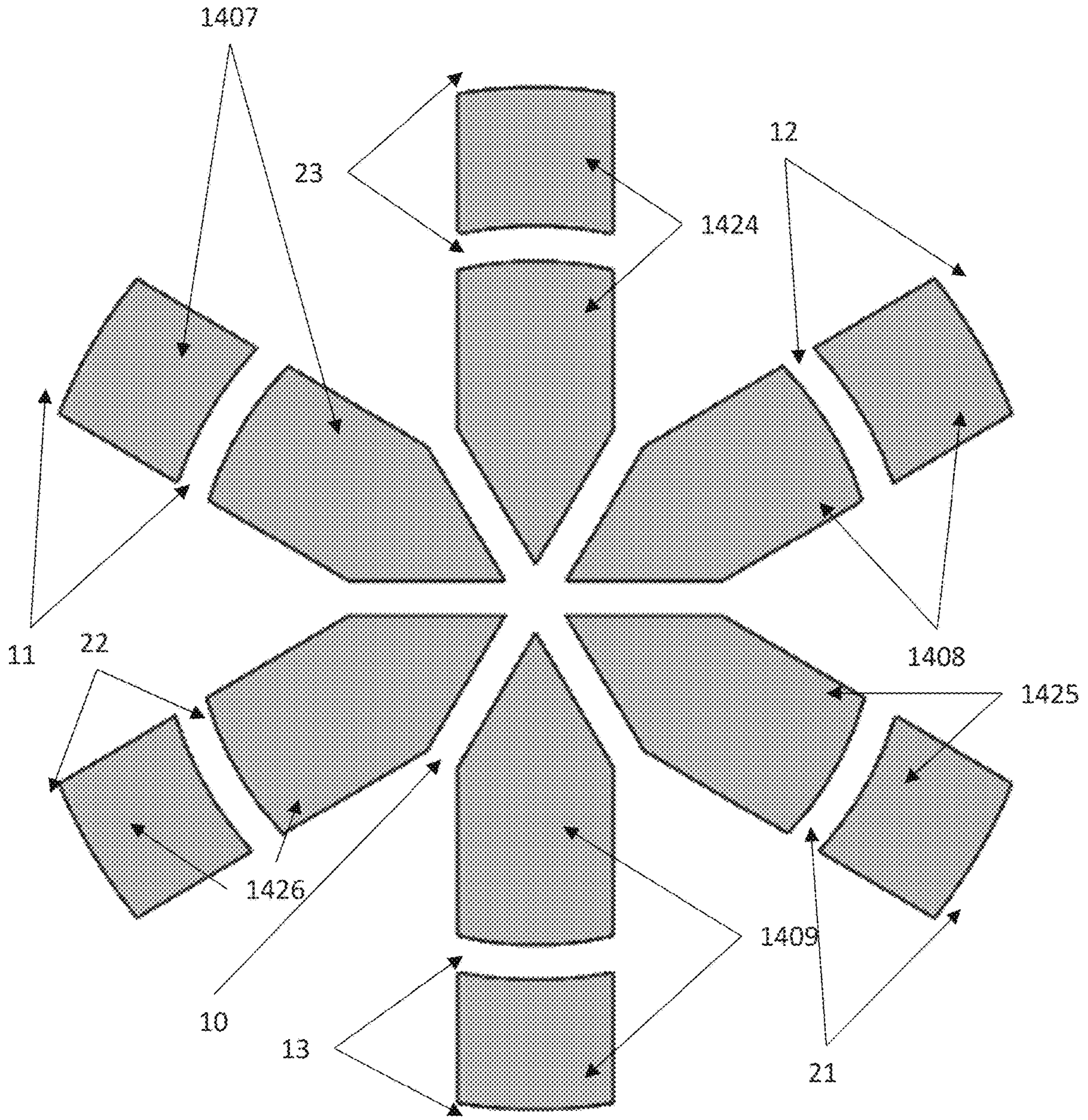

In some embodiments, the unit of FIG. 1 also shows the differential mode core segments (e.g., 7, 8 and 9 of FIG. 1). These segments create both inner (10) and outer (11,12,13) differential mode gaps. The inner gap (10) separates each differential mode core segment (e.g., 7, 8 and 9 of FIG. 1) from each other differential mode core segment (e.g., 7, 8 and 9 of FIG. 1) at a center of the core (e.g., with the differential mode core segments (e.g., 7, 8 and 9 of FIG. 1) extending radially therefrom). The outer gaps (11, 12, 13) separate respective ones of the differential mode core segments (e.g., 7, 8 and 9 of FIG. 1) from the common mode core segments (e.g., 1, 2 and 3 of FIG. 1). In some embodiments, the differential mode core segments (e.g., 7, 8 and 9 of FIG. 1) carry only differential mode flux as shown in FIG. 2. The gaps are adjustable to tune the differential mode inductance to the required value. The total number of differential mode segments can be increased to create additional differential mode gaps (see, e.g., FIG. 11, FIG. 13 and FIG. 14). This may be done to reduce external magnetic flux, reduce heating and reduce audible noise. The specific disclosures of differential mode gaps, the induction core design and construction described in U.S. Pat. No. 10,325,712, to Shudarek ("Shudarek U.S. Pat. No. 10,325,712") are hereby incorporated herein for all purposes.

Figure 9:
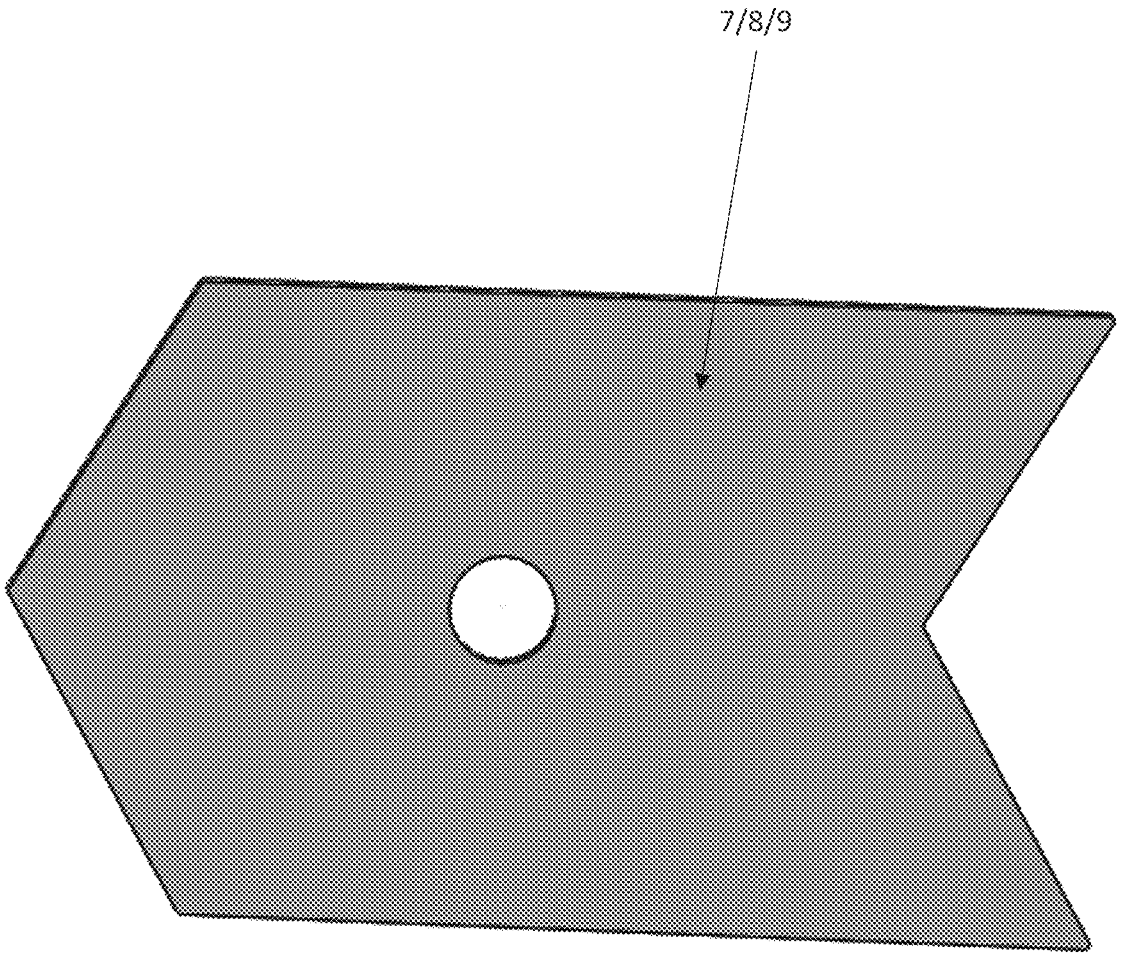

FIG. 9 depicts an illustrative differential mode core segment in accordance with aspects of embodiments of the present disclosure. In some embodiments, the shape of an individual differential mode core segment (e.g., 7, 8 and/or 9 of FIG. 1) in the core depicted in FIG. 1 may include a polygonal structure configured to have the differential mode gaps (e.g., 10, 11, 12 and 13 of FIG. 1) have an orientation rotated 90 degrees with respect to an orientation of the common mode gaps (e.g., 4, 5 and 6 of FIG. 1).

Figure 10:
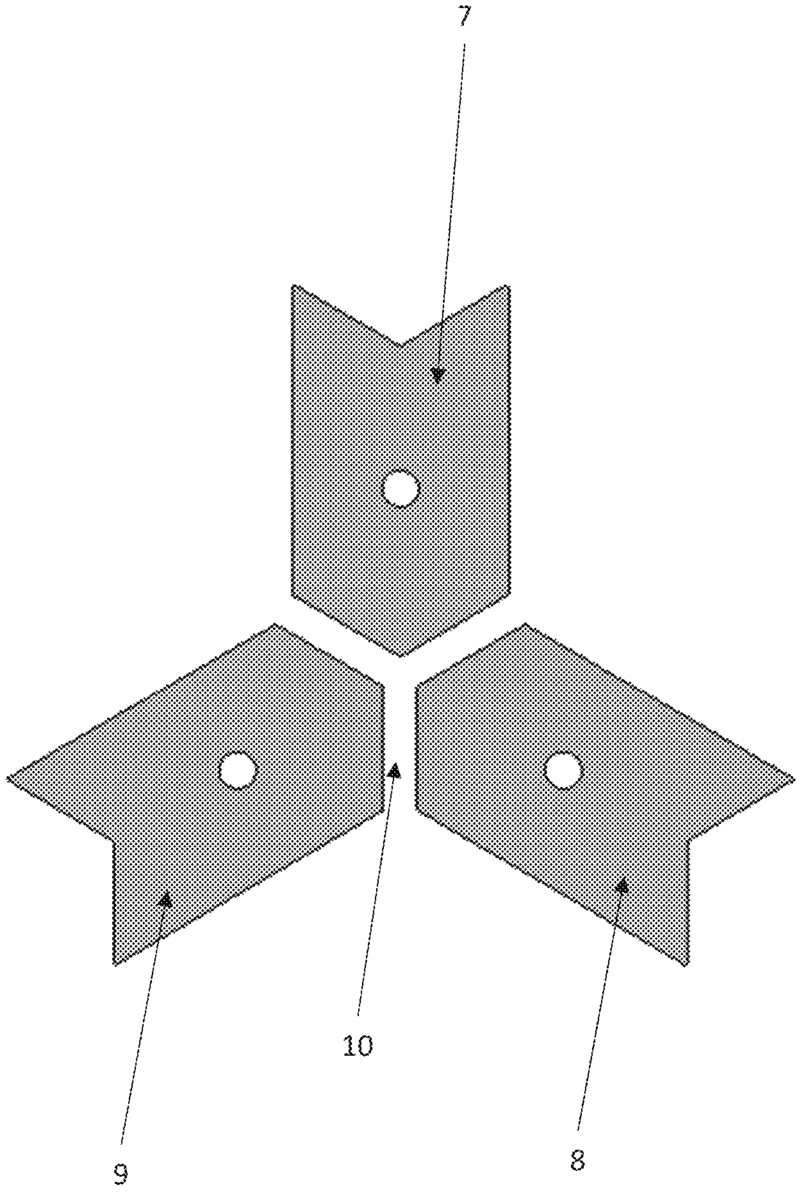
Figure 11:
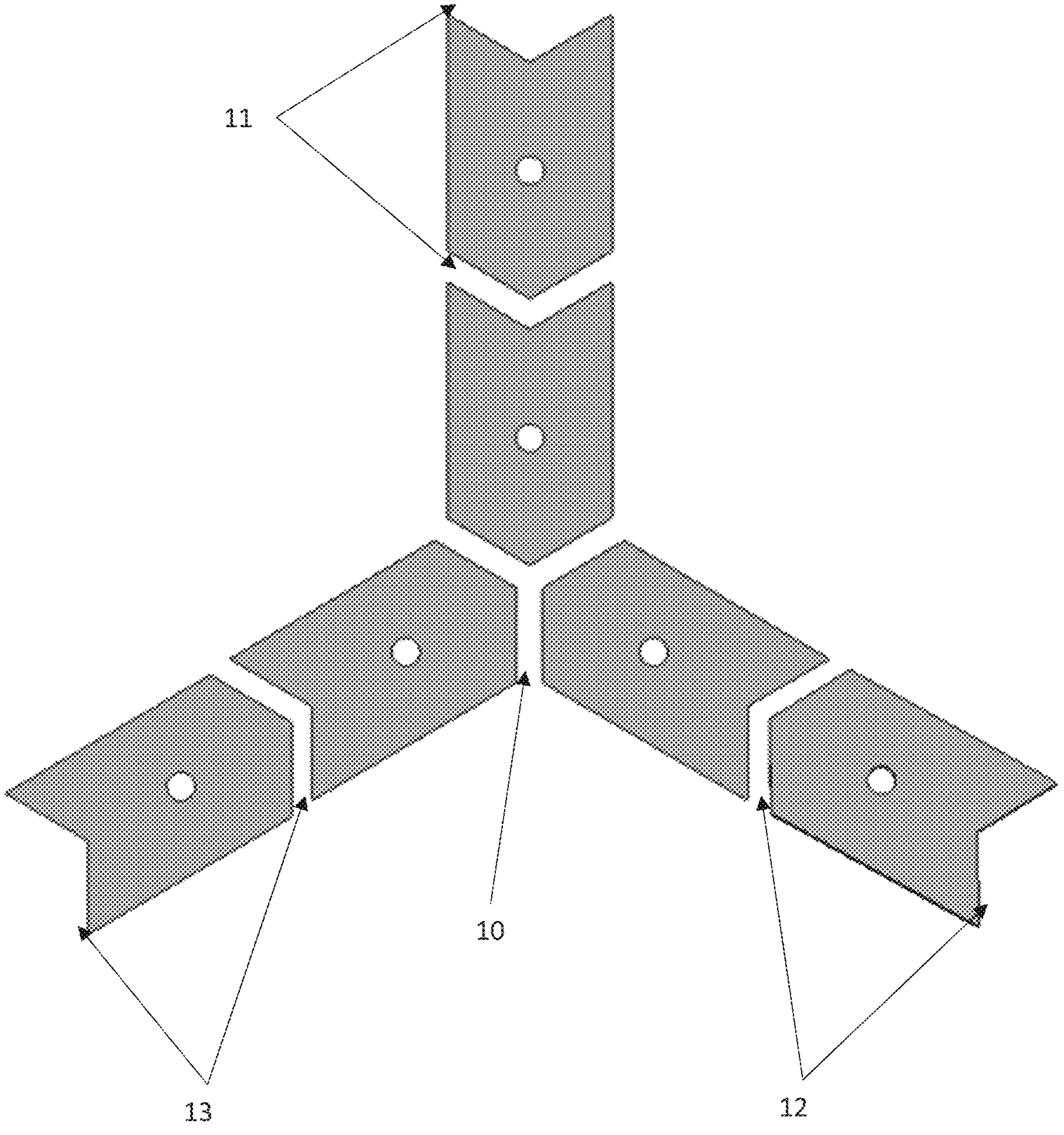

In some embodiments, an illustrative shape of a differential mode core section e.g., 7, 8 and 9 of FIG. formed from the differential mode core segments (e.g., 7, 8 and 9 of FIG. 1) with the gaps is shown in FIG. 10. In some embodiments, this geometry offers better mechanical support to the overall structure of the core and provides manufacturing ease. As discussed previously, additional gaps can be added to this section. For example, FIG. 11 shows the same section having three gaps (e.g., 10, 11, 12 and 13 of FIG. 1) with similar cut shapes to maintain structural uniformity. In some embodiments, there may be fewer gaps (e.g., 10, 11, 12 and 13 of FIG. 1). For example, in FIG. 10, the differential mode core segments (e.g., 7, 8 and 9 of FIG. 1) may be joined at a central position by eliminating gap (10). In some embodiment, the differential mode core segments (e.g., 7, 8 and 9 of FIG. 1) may be joined to form a single differential mode core segment with gaps (e.g., 11, 12 and 13 of FIG. 1), or may include three differential mode core segments (e.g., 7, 8 and 9 of FIG. 1) that are in contact to eliminate a gap (e.g., 10 of FIG. 1).

Figure 12:
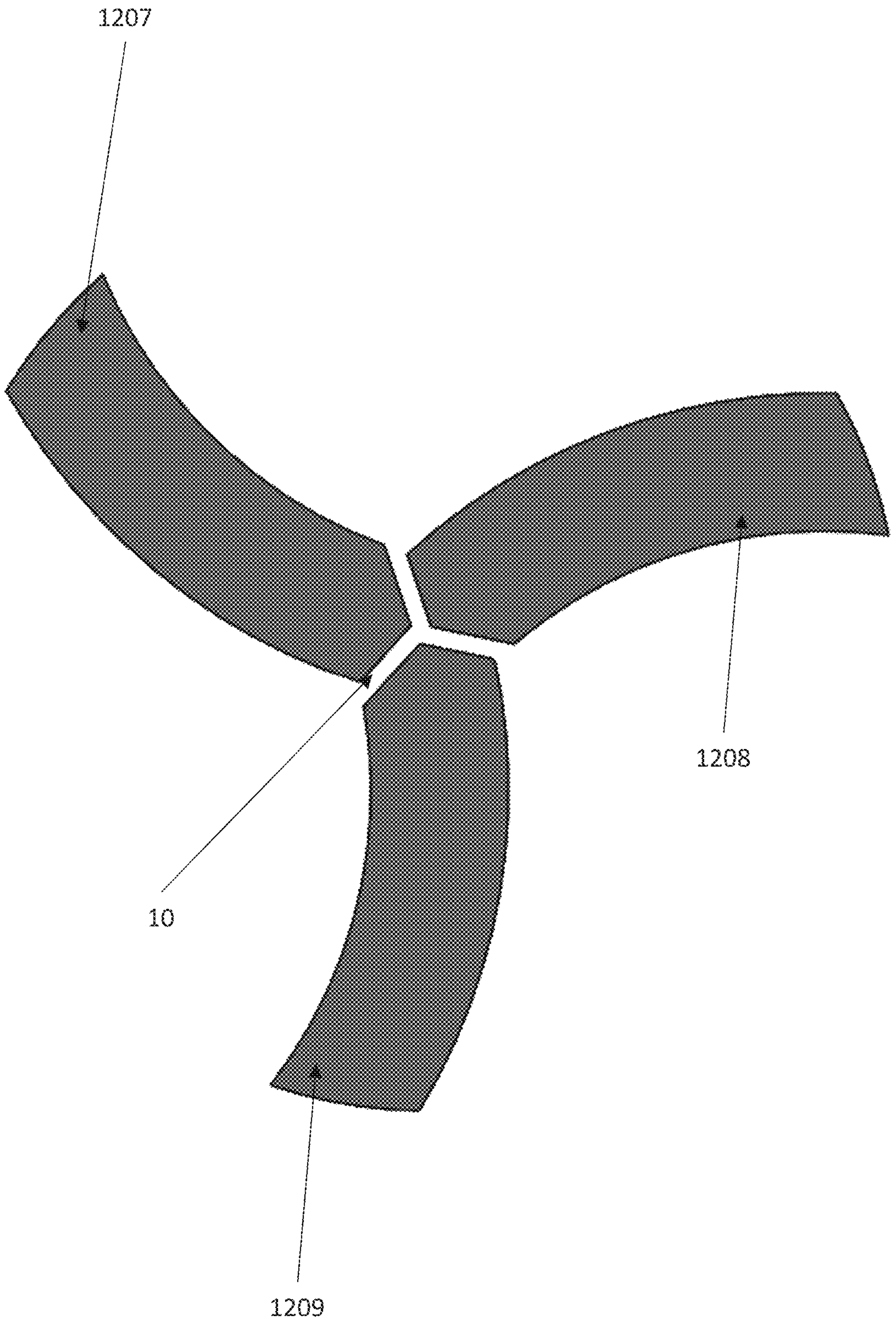

In some embodiments, other geometries could be used to create the differential mode core segments. Toroidal differential mode core segments (e.g., 1207, 1208 and 1209 of FIG. 12) could be created using cut toroids, see FIG. 12, or other fabricated core materials (1307, 1308, 1309), see FIG. 13. In addition, multiple branches could also be created. The use of additional branches (1424, 1425, 1426) of differential mode core segments may allow a reduction in flux through each branch, see FIG. 14. Each geometry of differential mode core segments (1407, 1408, 1409, 1424, 1425, 1426) may be combined with one or more of the common mode core segments as described above. For example, the toroidal differential mode core segments of FIG. 12 may be combined with the toroidal common mode core segments of FIG. 6, 7 and/or 8 (see, FIG. 16 below, for example). Similarly, the toroidal differential mode core segments of FIG. 12 may be combined with the straight-sided common mode cores segments of FIGS. 3 and 4, or the straight sided different mode core segments of FIG. 9, 10 or 11 may be combined with the toroidal common mode core segments of FIGS. 6, 7, and/or 8. The differential mode core segments of FIGS. 12 and 14 may be combined with either the straight sided or toroidal common mode core segments. Other shapes and combinations are also contemplated.

In some embodiments, the thickness of each of differential mode gaps (e.g., 10, 11, 12 and 13 of FIG. 1) can independently vary from 0.05 to 0.25 inches. In some embodiments, the thickness of each of the differential mode gaps (e.g., 10, 11, 12 and 13 of FIG. 1) can independently vary from 0.05 to 0.5 inches. In some embodiments, the thickness of each of the differential mode gaps (e.g., 10, 11, 12 and 13 of FIG. 1) can independently vary from 0.05 to 0.875 inches. In some embodiments, the thickness of each of the differential mode gaps (e.g., 10, 11, 12 and 13 of FIG. 1) can independently vary from 0.05 to 1 inches.

In some embodiments, a change in differential mode inductance is based, at least in part, on a shape of each lamination. For example, the present invention allows to increase the common mode inductance based on interleaving the core structure made of a plurality of core lamination pieces (i.e., each core lamination piece is made from the plurality of interleaved laminations) so that an effective non-magnetic gap in the common mode flux path is reduced. In some embodiments, the exemplary inventive core structure based on the plurality of core lamination pieces (i.e., each core lamination piece is made from the plurality of interleaved laminations) allows to achieve a maximum common mode inductance and still have an adjustable differential mode inductance.

Figure 15:
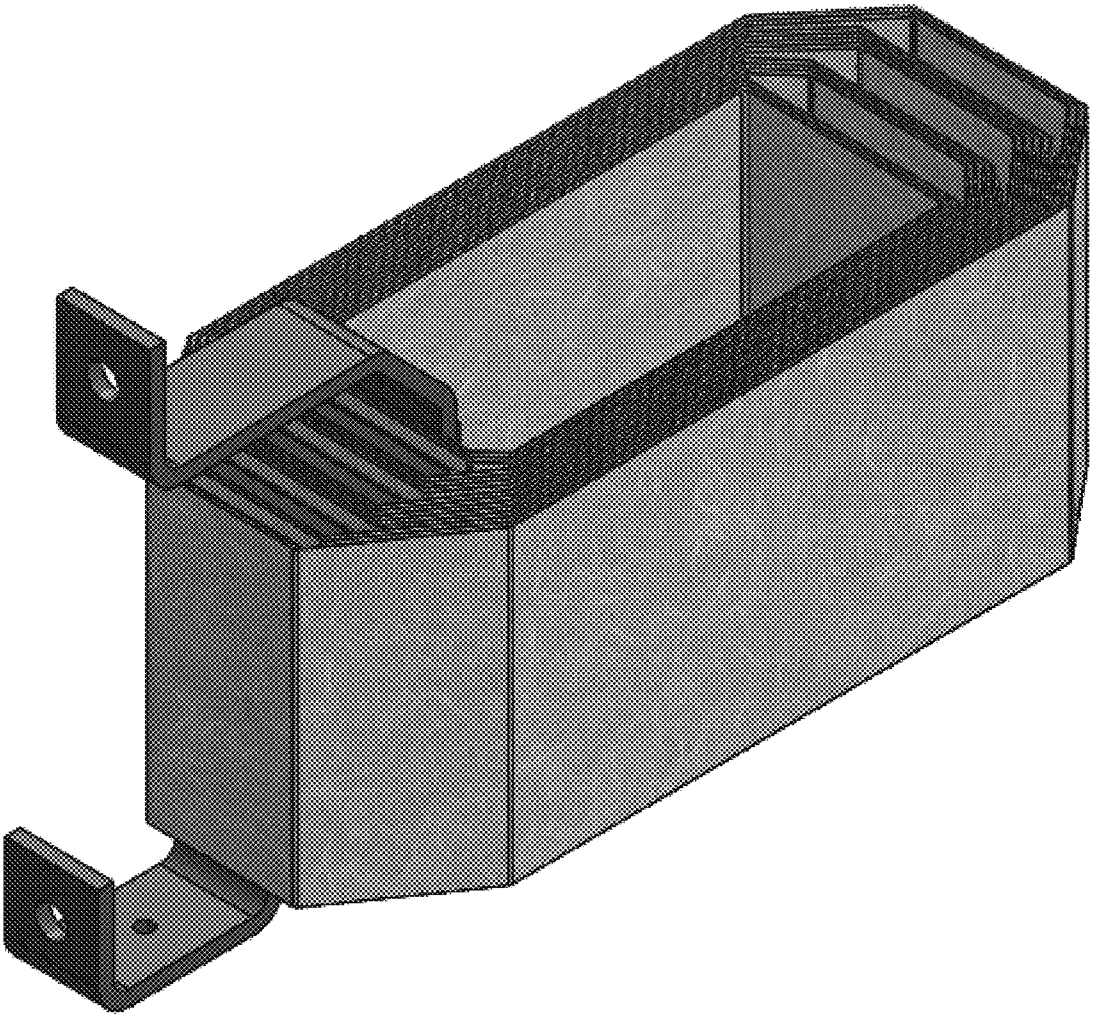

In some embodiments, examples of the coils (e.g., 14, 15 and 16 of FIG. 1 and FIG. 15) are shown in FIG. 15. In some embodiments, the coils may be wound with suitable winding materials such as, but not limited to, a copper or aluminum magnet wire, Litz wire, insulated copper foil, one other similarly suitable material, and any combination thereof. The coils may have bobbins which are constructed from suitable material used throughout the industry such as Rynite, glass-filled nylon, Dupont Nomex material. The coils use very typical industry termination such as the brazed terminals (e.g., 17, 18, 19, 20, 21 and 22 of FIG. 1 and FIG. 15) shown or terminal blocks.

Figure 16:
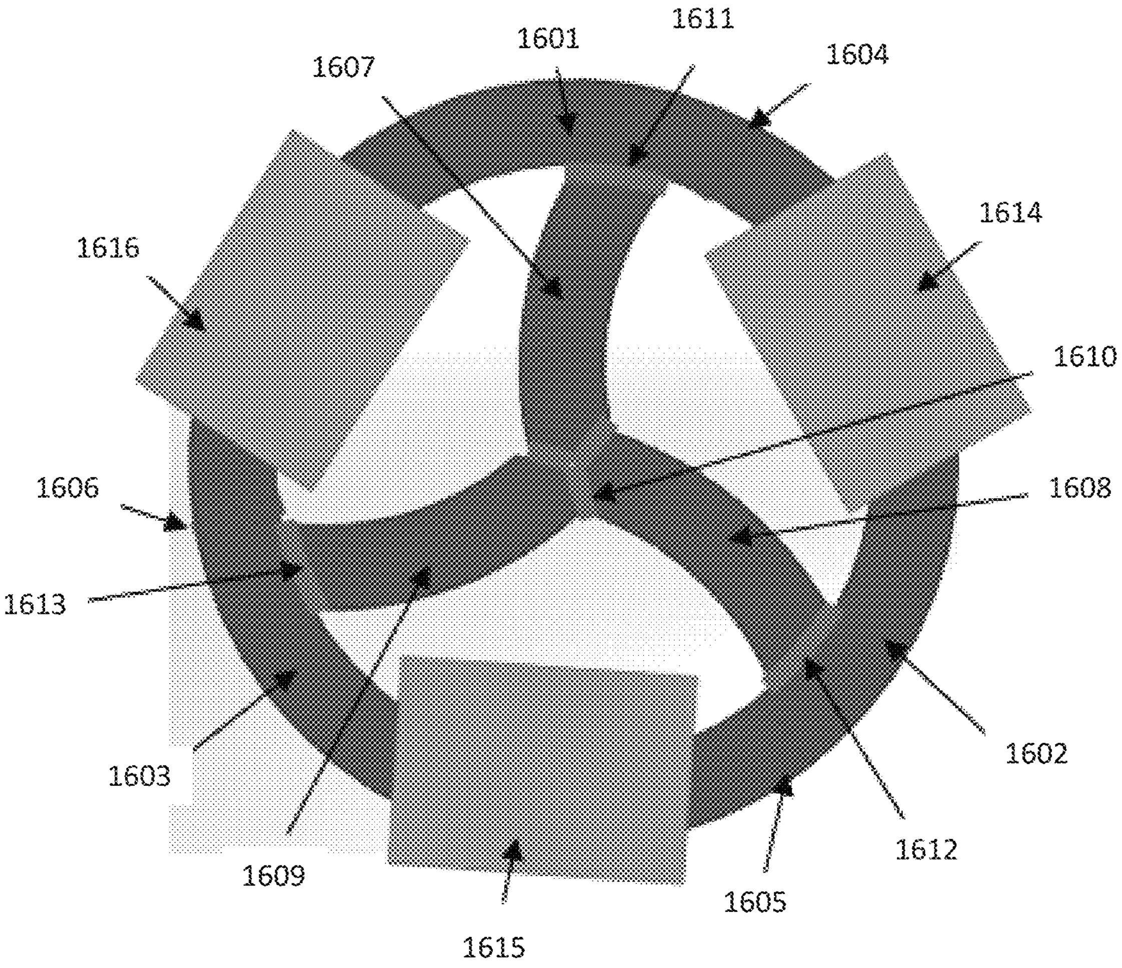

FIG. 16 shows another exemplary construction of the exemplary inventive induction core in accordance with some embodiments of the present invention. In some embodiments, the exemplary inventive induction core can include a toroidal induction core using toroidal common mode core segments (e.g., 1601, 1602 and 1603 of FIG. 16) forming a periphery of the toroidal induction core shape. Each toroidal common mode core segment (e.g., 1601, 1602 and 1603 of FIG. 16) may be separated from each adjacent toroidal common mode core segment (e.g., 1601, 1602 and 1603 of FIG. 16) by common mode gaps (e.g., 1604, 1605 and 1606 of FIG. 16). In some embodiments, an interior of the shape of the inductor core may include toroidal differential mode core segments (e.g., 1607, 1608 and 1609 of FIG. 16), for example having a spoke arrangement. Each toroidal differential mode core segment (e.g., 1607, 1608 and 1609 of FIG. 16) may be separated from each adjacent toroidal differential mode core segment and each adjacent toroidal common mode core segment (e.g., 1601, 1602 and 1603 of FIG. 16) by differential mode gaps (e.g., 1610, 1611, 1612 and 1613 of FIG. 16).

In some embodiments, the exemplary inventive toroidal induction core may include three coils (e.g., 1614, 1615 and 1616 of FIG. 16) that are wound with suitable winding materials such as, but not limited to, a copper or aluminum magnet wire, insulated copper foil, one other similarly suitable material, and any combination thereof. For example, the inventive construction can have at least one insulation material such as, but not limited to, Dupont Nomex material, insulating the exemplary inventive induction core from coils (e.g., 1614, 1615 and 1616 of FIG. 16).

All gaps (e.g., 1604, 1605, 1606, 1610, 1611, 1612 and 1613 of FIG. 16) can be filled with air and/or standard insulation material(s) such as Glastic, GLASROD, Thermavolt paper, Nomex, a fiberglass-reinforced thermoset polyester or any combination thereof. Some constructions may also use standard core materials for gaps such as powered iron, Molypermalloy, ferrite, steel, and Sendust. Thickness of each differential mode gap may vary from 0.05 to 1 inch. As mentioned previously multiple gaps can reduce the external magnetic flux fields, reduce heating and reduce audible noise.

In some embodiments, the exemplary inventive inductive core of the present invention can be utilized in, for example but not limited to, power conversion devises such as described in U.S. Pat. No. 8,653,931 to Zu, whose specific disclosures of such devices is hereby incorporated herein by reference.

In some embodiments, the exemplary inventive inductive core of the present invention can be utilized in, for example but not limited to, applications such as described in Shudarek U.S. Pat. No. 9,613,745, whose specific disclosures of such applications is hereby incorporated herein by reference.

In some embodiments, the instant invention can provide an electrical system that at least includes the following: at least one three-phase inductor, including: at least one core, including: a plurality of first core segments and at least one second core segment; where the plurality first core segments includes at least one first shape and are arranged in at least one first pattern to form a plurality of differential mode gaps between the plurality of first core segments and the at least one second core segment; where the at least one first shape is configured such the at least one first pattern is configured to allow to independently adjust a thickness of each differential mode gap from a thicknesses of each other differential mode gap of the plurality of differential mode gaps; where the at least one second core segment includes at least one second shape and is arranged in at least one second pattern around the plurality of first core segments; where the plurality of first core segments are in an interior of the core and the at least one second core segment is external to the plurality of first core segments; where the at least one first pattern is distinct from the at least one second pattern.

While a number of embodiments of the present invention have been described, it is understood that these embodiments are illustrative only, and not restrictive, and that many modifications may become apparent to those of ordinary skill in the art.

What is claimed is:

1. A device comprising:
at least one three-phase inductor, comprising:
at least one core, comprising:
a plurality of first core segments;
at least one second core segment; and
at least one inductive coil positioned on the at least one second core segment;
wherein each first core segment of the plurality of first core segments has at least one first shape;
wherein the plurality of first core segments is arranged in at least one first pattern so as to form:
a first plurality of differential mode gaps between the plurality of first core segments and
a second plurality of differential mode gaps between the plurality of first segments and the at least one second core segment;
wherein the at least one first shape is such that the at least one first pattern permits to independently adjust a thickness of each differential mode gap of the plurality of differential mode gaps;

wherein the at least one second core segment has at least one second shape; and wherein the plurality of first core segments are in an interior of the core and the at least one second core segment at least partially encompasses the plurality of first core segments.

2. The device as recited in claim 1, wherein the at least one first core segment comprises a polygonal shape.

3. The device as recited in claim 1, wherein the at least one second core segment comprises a toroidal shape.

4. The device as recited in claim 1, wherein an electrical current in the at least one inductor coil causes at least one common mode flux path associated with a common mode inductance around the at least on second shape via the at least one second core segment.

5. The device as recited in claim 1, wherein an electrical current in the at least one inductor coil causes a plurality of differential mode flux paths associated with a differential mode inductance through the at least on first shape via the plurality of first core segments; and wherein the differential mode inductance is adjusted by the thickness of each differential mode gap.

6. The device as recited in claim 1, wherein the at least one second core segment is a plurality of second core segments;

wherein the plurality second core segments are arranged in at least one second pattern to form a plurality of common mode gaps between the plurality of second core segments;

wherein the at least one second shape is such the at least one second pattern permits to independently adjust a thickness of each common mode of the plurality of common mode gaps; and wherein the at least one first pattern is different from the at least one second pattern.

7. A device comprising:

at least one three-phase inductor, comprising:

a plurality of stacked core laminations;

wherein the plurality of stacked core laminations comprises:

a plurality of first core segments, and at least one second core segment;

at least one inductive coil positioned on the at least one second core segment;

wherein each first core segment of the plurality of first core segments has at least one first shape;

wherein the plurality of first core segments is arranged in at least one first pattern so as to form:

a first plurality of differential mode gaps between the plurality of first core segments and a second plurality of differential mode gaps between the plurality of first segments and the at least one second core segment;

wherein the at least one first shape is such that the at least one first pattern permits to independently adjust a thickness of each differential mode gap of the plurality of differential mode gaps;

wherein the at least one second core segment has at least one second shape; and wherein the plurality of first core segments are in an interior of the core and the at least one second core segment at least partially encompasses the plurality of first core segments.

8. The device as recited in claim 7, wherein the at least one first core segment comprises a polygonal shape.

9. The device as recited in claim 7, wherein the at least one second core segment comprises a toroidal shape.

10. The device as recited in claim 7, wherein an electrical current in the at least one inductor coil causes at least one common mode flux path associated with a common mode inductance around the at least on second shape via the at least one second core segment;

wherein an electrical current in the at least one inductor coil causes a plurality of differential mode flux paths associated with a differential mode inductance through the at least on first shape via the plurality of first core segments; and wherein the differential mode inductance is adjusted by the thickness of each differential mode gap.

11. The device as recited in claim 7, wherein each stacked core lamination of the plurality of stacked core laminations is interleaved with at least one adjacent stacked core lamination of the plurality of stacked core laminations.

12. The device as recited in claim 7, wherein the at least one second core segment is a plurality of second core segments;

wherein the plurality second core segments are arranged in at least one second pattern to form a plurality of common mode gaps between the plurality of second core segments;

wherein the at least one second shape is such the at least one second pattern permits to independently adjust a thickness of each common mode of the plurality of common mode gaps; and wherein the at least one first pattern is different from the at least one second pattern.

13. A method comprising:

providing at least one three-phase inductor, comprising:

at least one core, comprising:

a plurality of first core segments and at least one second core segment;

at least one inductive coil positioned on the at least one second core segment;

wherein each first core segment of the plurality of first core segments has at least one first shape;

wherein the plurality of first core segments is arranged in at least one first pattern so as to form:

a first plurality of differential mode gaps between the plurality of first core segments and a second plurality of differential mode gaps between the plurality of first segments and the at least one second core segment;

wherein the at least one first shape is such that the at least one first pattern permits to independently adjust a thickness of each differential mode gap of the plurality of differential mode gaps;

wherein the at least one second core segment has at least one second shape; and wherein the plurality of first core segments are in an interior of the core and the at least one second core segment at least partially encompasses the plurality of first core segments.

14. The method as recited in claim 13, wherein the at least one first core segment comprises a polygonal shape.

15. The method as recited in claim 13, wherein the at least one second core segment comprises a toroidal shape.

16. The method as recited in claim 13, wherein an electrical current in the at least one inductor coil causes at least one common mode flux path associated with a common mode inductance around the at least on second shape via the at least one second core segment;

wherein an electrical current in the at least one inductor coil causes a plurality of differential mode flux paths associated with a differential mode inductance through the at least on first shape via the plurality of first core segments; and wherein the differential mode inductance is adjusted by the thickness of each differential mode gap.

17. The method as recited in claim 13, wherein the at least one second core segment is a plurality of second core segments;

wherein the plurality second core segments are arranged in at least one second pattern to form a plurality of common mode gaps between the plurality of second core segments;

wherein the at least one second shape is such the at least one second pattern permits to independently adjust a thickness of each common mode of the plurality of common mode gaps; and wherein the at least one first pattern is different from the at least one second pattern.

* * * * *